US008939459B2

(12) United States Patent
Battlogg et al.

(10) Patent No.: US 8,939,459 B2
(45) Date of Patent: Jan. 27, 2015

(54) SUSPENSION FORK, IN PARTICULAR FOR A BICYCLE (71) Applicant: DT Swiss Inc., Grand Junction, CO (US)

(72) Inventors: Stefan Battlogg, St. Anton I.M. (AT); Martin Walthert, Aarberg (CH); Michael Kieber, Schruns (AT); Juergen Poesel, Bludenz (AT)

(73) Assignee: DT Swiss, Inc., Grand Junction, CO (US)

( * ) Notice: Subject to any disclaimer, the term of this patent is extended or adjusted under 35 U.S.C. 154(b) by 0 days.

(21) Appl. No.: 14/012,221

(22) Filed: Aug. 28, 2013

(65) Prior Publication Data
US 2014/0062057 A1    Mar. 6, 2014

(30) Foreign Application Priority Data

Aug. 28, 2012   (DE) .......................... 10 2012 016 947

(51) Int. Cl.
*B62K 25/08*    (2006.01)
(52) U.S. Cl.
CPC ..................................... *B62K 25/08* (2013.01)
USPC ....................... 280/276; 188/267.1
(58) Field of Classification Search
CPC ........... B62K 25/08; F16F 9/532; F16F 9/535
USPC ..................... 280/276, 275; 188/267.1, 267.2
See application file for complete search history.

(56) References Cited

U.S. PATENT DOCUMENTS

| 5,275,264 | A | * | 1/1994 | Isella ......................... 188/299.1 |
| 6,105,987 | A | * | 8/2000 | Turner ........................ 280/276 |
| 7,413,064 | B2 | * | 8/2008 | Furuya ....................... 188/282.1 |
| 8,813,922 | B2 | * | 8/2014 | Mochizuki .................... 188/313 |
| 2001/0004036 | A1 | * | 6/2001 | Gonzalez et al. .......... 188/319.2 |
| 2008/0061527 | A1 | * | 3/2008 | Inaguma ...................... 280/276 |
| 2009/0001684 | A1 | * | 1/2009 | McAndrews et al. ......... 280/276 |
| 2012/0160621 | A1 |   | 6/2012 | Battlogg et al. |
| 2012/0186921 | A1 | * | 7/2012 | Battlogg et al. ........... 188/267.1 |
| 2013/0134688 | A1 | * | 5/2013 | Mochizuki et al. .......... 280/276 |

FOREIGN PATENT DOCUMENTS

DE    102010055830 A1    6/2012
DE    102011009406 A1    7/2012

* cited by examiner

*Primary Examiner* — Kevin Hurley
*Assistant Examiner* — Michael Stabley
(74) *Attorney, Agent, or Firm* — Laurence A. Greenberg; Werner H. Stemer; Ralph E. Locher (57) ABSTRACT A suspension fork for a bicycle has a tube system with an inner tube and an outer tube that are movable relative to one another. A damper system with a field-sensitive damping fluid is provided within the tube system. The damper device has a damper chamber that is partitioned to form a first chamber and a second chamber by a movable piston attached to a piston rod. A first throttle valve with a first field generating device and a second throttle valve with a second field generating device enable influencing the first and second throttle valves. First and second switching valves are provided. The first and second throttle valves and the first and second switching valves are interconnected such that in the compression stage there is flow only through the first throttle valve while in the rebound stage the first and second throttle valves are connected in series.

22 Claims, 5 Drawing Sheets

SUSPENSION FORK, IN PARTICULAR FOR A BICYCLE

CROSS-REFERENCE TO RELATED APPLICATION

This application claims the priority, under 35 U.S.C. §119, of German patent application DE 10 2012 016 947.7, filed Aug. 28, 2012; the prior application is herewith incorporated by reference in its entirety.

BACKGROUND OF THE INVENTION

Field of the Invention

The present invention relates to a suspension fork for an at least partially muscle-powered vehicle and in particular a two-wheeled vehicle such as a bicycle. Such suspension forks comprise a head tube and at least one tube system connected therewith and having an inner tube and an outer tube that is movable and in particular telescoping relative thereto. Adjacent to the tube system a wheel receiving space is provided. When, as tends to be usual, the suspension fork comprises a pair of parallel, adjacent tube systems, then the wheel receiving space is located between the tube systems.

Different suspension forks have become known in the prior art. A damper system tends to be provided in an inner tube of the suspension fork while a suspension system is accommodated in the other of the inner tubes. Or else it is possible for both a damper system and a suspension system to be provided on one side in the inner tube.

Many different suspension forks have become known in the prior art which use oil as the damping fluid. In known suspension forks the damping is adjusted in the compression stage and the damping in the rebound stage via a plurality of mechanically adjustable valves. Different flow paths are typically provided for low-speed damping and for high-speed damping. Additional blow-off valves may be provided which open in the case of particularly forceful shocks so as to avoid excessive loads. While these known suspension forks operate reliably, their structures are complicated, comprising a plurality of adjusting mechanisms such that it can be difficult to find optimal settings.

Suspension forks can be simpler in structure where for example magneto-rheological or electro-rheological fluids are employed as the damping medium since then the damping fluid flowing through a damping duct can be exposed to an appropriate magnetic or electric field by way of which the desired damping can be adjusted.

BRIEF SUMMARY OF THE INVENTION

It is accordingly an object of the invention to provide a suspension fork, in particular for a bicycle, which overcomes the above-mentioned disadvantages of the heretofore-known devices and methods of this general type and which provides for a suspension fork that is simple in structure and allows reliable operation.

With the foregoing and other objects in view there is provided, in accordance with the invention, a suspension fork, comprising:

a head tube, at least one tube system connected to said head tube and including an inner tube and an outer tube movably disposed relative to one another, and a wheel receiving space adjacent said tube system;

a damper device disposed within said tube system, said damper device having a damper chamber, a field-sensitive damping fluid, and a piston connected to a piston rod and movable in a compression stage and a rebound stage, said piston partitioning said damper chamber to form a first chamber and a second chamber;

a first throttle valve with a first field generating device and a second throttle valve with a second field generating device configured for selectively influencing said first and second throttle valves; and a first switching valve and a second switching valve configured and interconnected with said first and second throttle valves to cause a flow of damping medium only through said first throttle valve in the compression stage while, in the rebound stage, said first and second throttle valves are connected in series.

In other words, a suspension fork according to the invention is provided for an at least partially muscle-powered vehicle. It is particularly suited for a bicycle. The suspension fork according to the invention comprises a head tube and at least one tube system connected therewith and comprising an inner tube and an outer tube movable relative thereto. Adjacent to the tube system a wheel receiving space is provided. When the suspension fork comprises two tube systems, then the wheel accommodation is located between the tube systems.

At or in at least one tube system at least one damper device with a field-sensitive damping fluid is provided. The damper device is provided with a damper chamber and is partitioned by way of a piston that is movable and connected with a piston rod to form a first chamber and a second chamber.

A first and a second throttle valve are provided wherein the first throttle valve is provided with a first field generating device and the second throttle valve, with a second field generating device so as to appropriately influence the first and second throttle valves. Furthermore, a first and a second switching valve are provided. The first and second throttle valves and the first and second switching valves are interconnected such that in the compression stage there is flow only through the first throttle valve while in the rebound stage the first and second throttle valves are connected in series.

The suspension fork according to the invention has many advantages. A considerable advantage of the suspension fork according to the invention consists in that two throttle valves are provided which are switched automatically by way of two switching valves. In the compression stage only the first throttle valve acts while in the rebound stage the first and second throttle valves act. This configuration allows in a simple way flexible damping characteristics which differ from one another for the compression stage and the rebound stage.

In particular is the suspension fork controlled in real time wherein responses to shocks occur in real time. Since a magneto-rheological fluid, as it is examplarily and preferably employed as the field-sensitive fluid, responds to field changes within the briefest of delays, response times of one millisecond or a few milliseconds can be achieved.

Basically there is thus the option to provide by way of one single throttle valve the damping required in real time both in the rebound stage and in the compression stage. However, this configuration shows the drawback of requiring a high level of dynamics if both minor shocks and major shocks are intended to be dampened appropriately. There are in particular differences in optimal damping in the compression stage and in the rebound stage.

This is why the suspension fork according to the present invention shows considerable advantages due to using two throttle valves. Due to the fact that only one of the two throttle valves is active in the compression stage, said throttle valve can be optimally adjusted to the desired compression stage damping. The second throttle valve which in the rebound stage is connected in series may for example provide a basic curve of the rebound stage damping which is adequately superposed by the first throttle valve for adjusting the currently desired damping characteristic.

An emergency running function for the compression stage may for example be realized by incorporating a permanent magnet in the first throttle valve.

The second throttle valve may for example provide emergency running properties in the rebound stage by way of a permanent magnet present therein. Preferably the first switching valve and/or the second switching valve each comprise at least three ports, at least two of which being connected in each position.

A central or normal position is possible and preferred in which all three of the ports are interconnected. In advantageous configurations the first switching valve and/or the second switching valve are biased to the central or normal position.

Preferably the first and/or second throttle valve each comprise a first inlet and a second inlet. Depending on the flow direction one of the inlets may serve as an outlet.

It is preferred for the second chamber to be connected with a first port of the first switching valve and with a first inlet of the first throttle valve. The connection may be direct or else by way of a connection line.

It is also preferred for the second inlet of the first throttle valve to be connected with a third port of the second switching valve.

In accordance with an added feature of the invention, the first chamber is connected with a second port of the first switching valve and with a first inlet of the second throttle valve.

The second inlet of the second throttle valve is in particular connected with a first port of the second switching valve.

It is possible for the second port of the second switching valve to be connected with the third port of the first switching valve.

In all the configurations it is possible and preferred that in a first position of the first switching valve the second port is connected with the third port. In a second position of the first switching valve the second port is then connected with the first port.

Preferably in a first position of the second switching valve the second port is connected with the third port and in a second position, the first port with the third port.

In all the cases it is preferred for the piston rod to extend through and out of the first chamber and outwardly out of the damper chamber.

In these configurations it is preferred to provide an equalizing chamber with an in particular upstream equalizing volume.

In all the cases the first throttle valve comprises in particular one or at least one electric coil as the at least one field generating device.

In all the cases it is also preferred for the second throttle valve to comprise a remanence magnet and an electric coil wherein a strength of the magnetic field of the remanence magnet is permanently adjustable by way of a magnetic pulse of the electric coil. A remanence magnet in the sense of the present application characterizes a permanent magnet which is changeable in its magnetic field strength in operation. The electric coil may serve this purpose.

In all the cases a control device is preferably provided. At least one sensor device may be provided.

At least one sensor device may be provided for capturing a rate for a relative speed. In particular does at least one sensor device serve for capturing a rate for a relative speed of the piston to the damper chamber.

It is also preferred to provide at least one sensor device for capturing a direction of the relative motion between the piston and the damper chamber.

At least one sensor device may capture a measure for compression travel that is already compressed and/or that is still available.

In all the configurations it is possible and preferred to provide at least one end position damping. Such an end position damping can increase damping in an end portion during compressing or rebound to prevent knock-through at the suspension fork.

In use as intended the first and second throttle valves are advantageously disposed above the damper chamber. In particular is the equalizing chamber provided above at least one throttle valve.

The second throttle valve may in particular serve as a lowering valve and/or may provide emergency running properties.

A considerable advantage of the invention is also that the space present in a conventional suspension fork can be optimally utilized.

The second throttle valve may also serve as a lowering valve and it may for example be provided for lowering, or for keeping lowered, the suspension fork in uphill rides.

Even in the lowered state the damping of shocks is still possible. After the uphill ride the lowering valve may be deactivated such that the suspension fork quickly returns to its normal, rebound position in normal operation.

In particular the first switching valve allows to always switch the equalizing chamber and the equalizing volume to the low-pressure area, i.e. behind the throttle valves. This allows to achieve a rigid system not operating into the equalizing volume even with high damping forces.

Other features which are considered as characteristic for the invention are set forth in the appended claims.

Although the invention is illustrated and described herein as embodied in a suspension fork, in particular for bicycles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
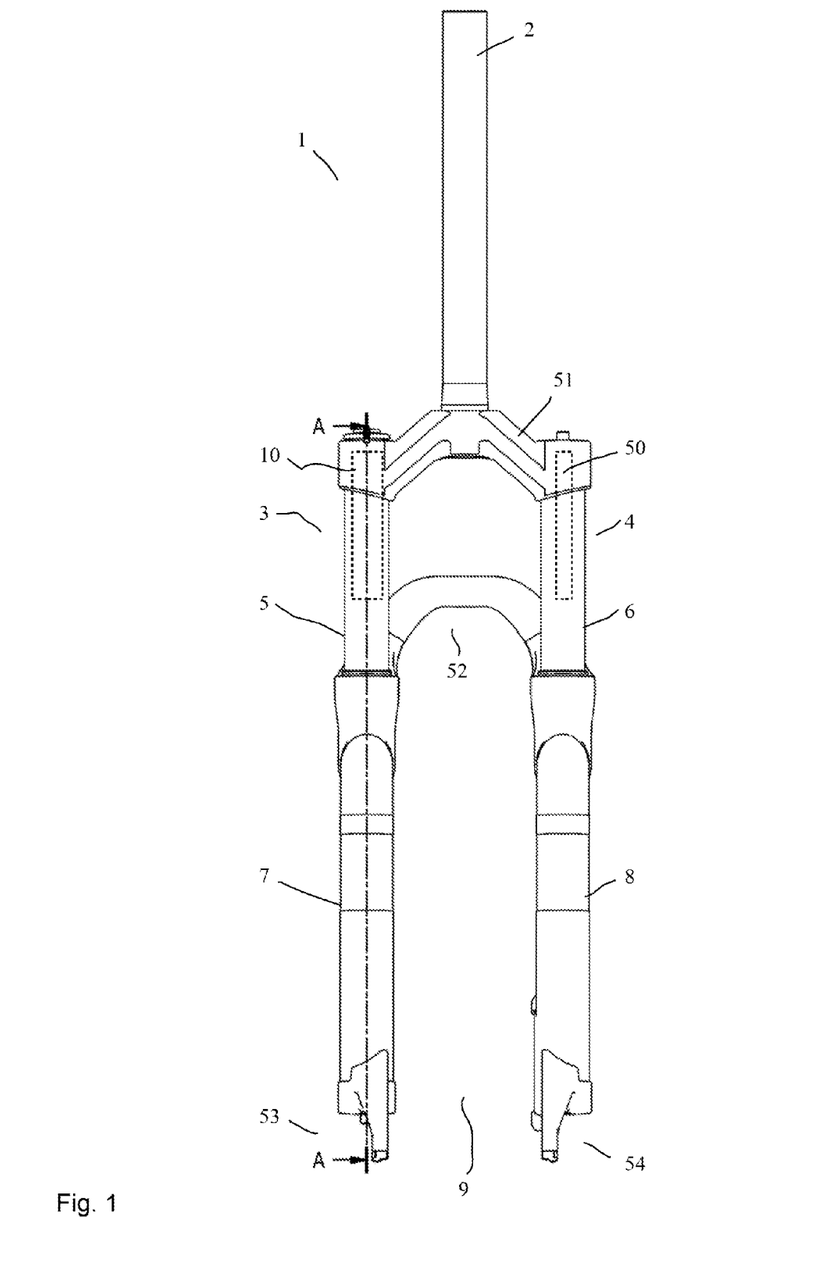
FIG. 1 is a front view of a suspension fork according to the invention.

Referring now to the figures of the drawing in detail and first, particularly, to FIG. 1 thereof, there is shown a suspension fork 1 according to the invention in a front view. The suspension fork comprises a head tube 2 at which a fork crown 51 is attached. The two tube systems 3 and 4 are disposed at the fork crown 51. Each of the tube systems 3, 4 presently comprises an inner tube 5, 6, and an outer tube 7, 8, which are telescoping relative to one another.

The two outer tubes 7 and 8 are connected with one another by means of a connecting bracket 52. The lower end of the suspension fork is provided with dropouts 53 and 54 at the outer tubes 7 and 8. A bicycle wheel may be disposed at the dropouts 53 and 54. To this end a wheel receiving space 9 is provided between the tube systems 3 and 4.

In the illustrated exemplary embodiment a damper device 10 is disposed in the tube system 3 while a suspension device 50 is disposed in the tube system 4.

Figure 2:
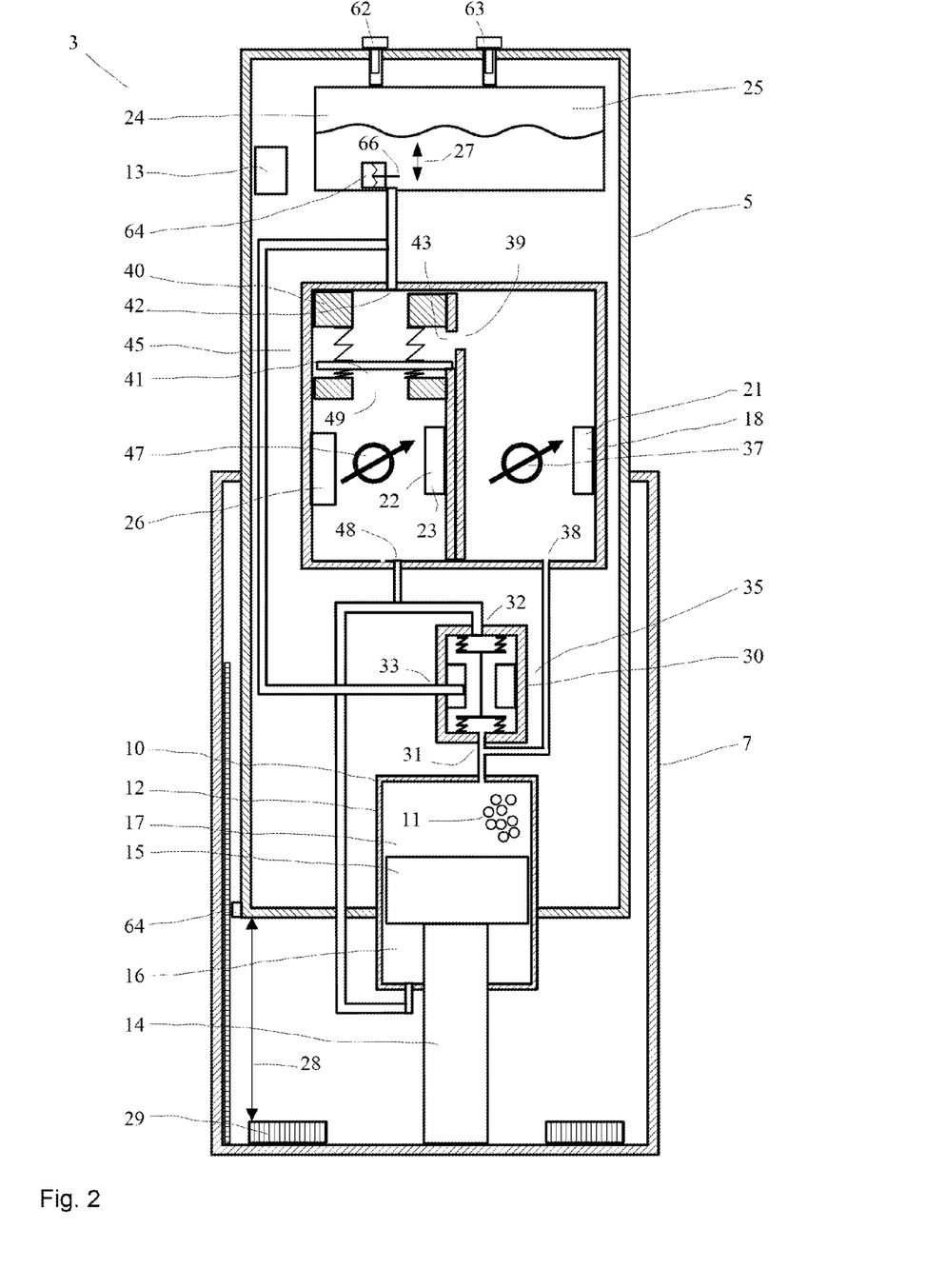
FIG. 2 is a diagrammatic and schematic longitudinal section of a tube system for the suspension fork according to FIG. 1 in a normal position.

FIG. 2 shows a schematic cross-sectional illustration of the tube system of the suspension fork of FIG. 1. The outer tube 7 telescopingly glides on the inner tube 5. In the interior of the inner tube 5 the damper device 10 is disposed comprising a damper chamber 12 which is partitioned by means of a piston 15 to form a first chamber 16 and a second chamber 17.

The piston 15 is provided with a piston rod extending through the first chamber 16 and out of the inner tube 5. The other end of the piston rod 14 is connected with the lower end of the outer tube 7.

Above the damper chamber 12 the throttle valves 37 and 47 and the equalizing chamber 24 with the equalizing volume 25 are disposed.

A control device 13 serves for controlling the suspension fork 1. A battery unit—not shown—supplies the control device and the suspension fork 1 with the required electric energy.

Presently the piston 15 is configured as a pump piston such that there are substantially no connecting lines through the piston 15 from the first chamber 16 to the second chamber 17. The first chamber 16 is connected with the second port 32 of the first switching valve 30 via a fluid line. The switching valve 30 comprises three ports 31, 32, and 33. In the normal state illustrated in FIG. 2 all the three ports 31 to 33 are interconnected. The switching valve 30 may be biased by biasing devices such as springs to the normal position or central position 35 illustrated in FIG. 2. When the ports 31 and 33 of the first switching valve 30 are connected in the normal position this may improve responsivity of the suspension fork.

Moreover the first chamber 16 is also connected with the first inlet 48 of the second throttle valve 47.

The second chamber 17 is on the one hand connected with the first port 31 of the first throttle valve 30 and on the other hand, with the first inlet 38 of the first throttle valve 37. The second inlet 39, via which field-sensitive fluid entering through the first inlet 38 is drained back off, is connected with the third port 43 of the second switching valve 40.

The second switching valve presently also comprises three ports 41, 42, and 43. The switching valve 40 may be biased by biasing devices such as springs to the normal position illustrated in FIG. 2. Although the normal position 45 of the second switching valve 40 may be a central position, it may be configured as an end position.

The first port 41 of the second switching valve 40 is connected with the second inlet 49 of the second throttle valve 47. The second port 42 of the second throttle valve 40 is on the one hand connected with the equalizing chamber 24 and on the other hand with the third port 33 of the first switching valve 30.

Multiple sensor devices 64 may be provided. For example a sensor device 64 with a spring leaf as the detector 66 or the like may be disposed in the equalizing chamber 24 or in a line leading there. The spring leaf is deflected by way of the flow of the field-sensitive fluid such that the direction 27 of the deflection allows to detect the direction of the flow.

In the compression stage in compressing, the piston rod 14 continues to enter further into the damper chamber 12 such that part of the field-sensitive fluid must pass into the equalizing chamber 24. This can be detected by the sensor device 64. Reversely, in the case of the rebound stage, part of the piston rod 14 emerges out of the damper chamber 12 such that part of the field-sensitive fluid must emerge out of the equalizing chamber 24. The direction of such flow can also be detected by the sensor device 64.

In the alternative or supplementarily it is also possible to provide a sensor 64 for detecting the relative motion between the damper piston and the damper chamber or between the inner tube 5 and the outer tube 7. By way of the relative motions of the different components to one another conclusions are possible about the relative speed and the relative acceleration, and about the currently applied loads.

By means of these sensor data the control device 13 can operate the field generating devices 18 or 23 of the first throttle valve 37 and of the second throttle valve 47 in real time so as to allow response e.g. to the shock even while a load is occurring.

It is possible for the first throttle valve 37 to comprise an electric coil 21 as the field generating device 18. In analogy the second throttle valve 47 may comprise an electric coil 22 as the field generating device 23.

Or else it is possible for one or both of the throttle valves 37 and 47 and in particular the second throttle valve 47 to comprise a permanent magnet or a remanence magnet 26. What is presently called a remanence magnet is a permanent magnet which can be remagnetized in operation by the electric coil 22. To this end the electric coil 22 emits a brief though intense magnetic pulse which causes a permanent change of the magnetic field of the remanence magnet 26. In this way one single brief pulse can influence damping permanently and adjust it as desired without permanently consuming electric current. This allows economic operation and in particular also emergency running properties.

Presently the second throttle valve 47 is connected in series with the first throttle valve 37 in the rebound stage only. By means of the remanence magnet 26 or else a non-variable permanent magnet a minimum damping in the rebound stage is ensured even if electric energy is lost.

The field-sensitive damping fluid 11 in the exemplary embodiment is a magneto-rheological fluid comprising ferromagnetic particles ultra-finely dispersed in the carrier medium.

Furthermore a sensor device 64 may be provided which detects for example the compression travel 28 or the compression travel still available. An end position damping 29 may be provided to prohibit the outer tube 7 from hitting against the inner tube 5.

Valves 62 and 63 allow filling up or changing the magneto-rheological fluid or compressed air can be filled up into the equalizing chamber 24.

With reference to the FIGS. 3 and 4 the function of the suspension fork 1 according to the invention will be discussed.

Figure 3:
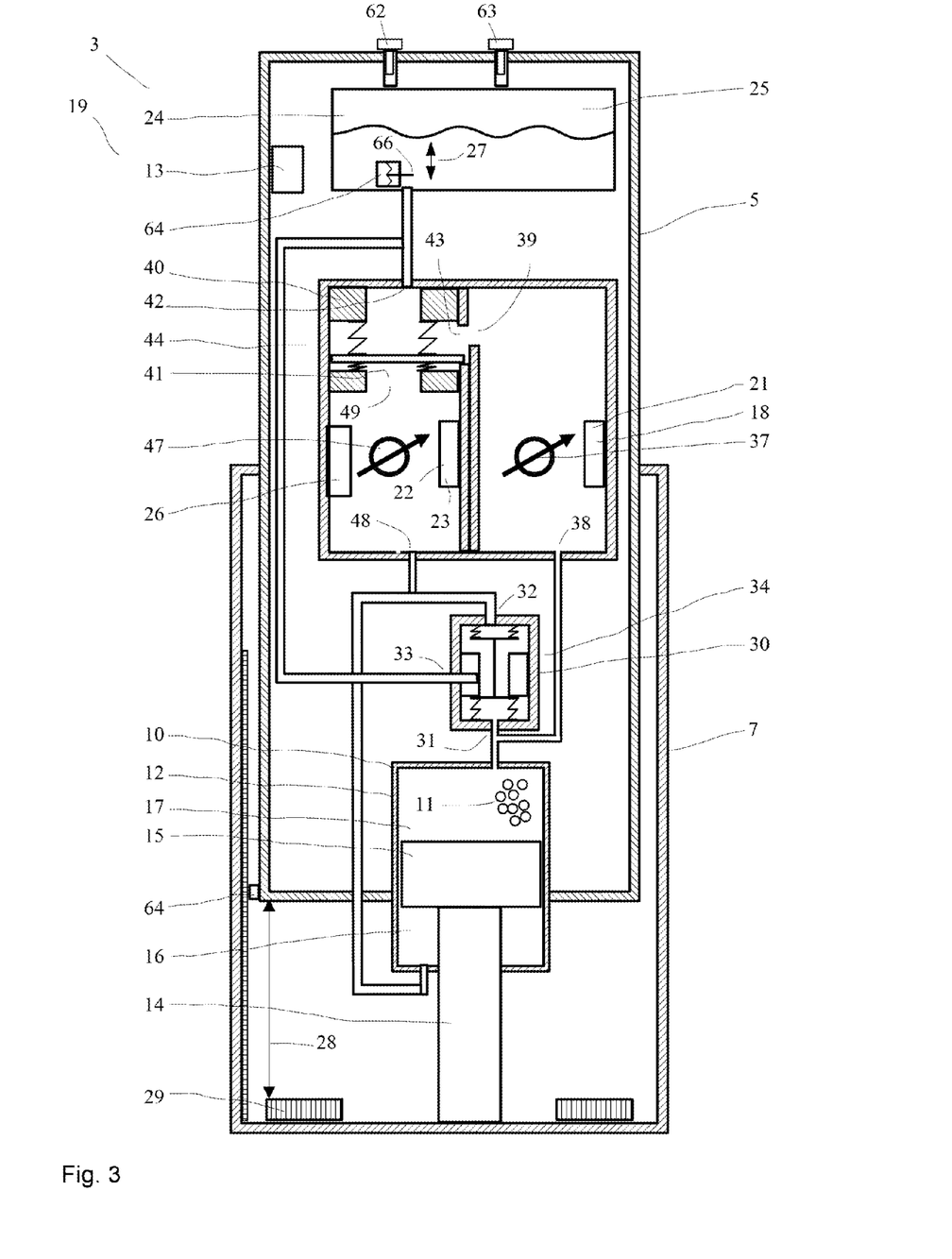
FIG. 3 is a similar sectional illustration of the tube system according to FIG. 2 in the compression stage.
Figure 4:
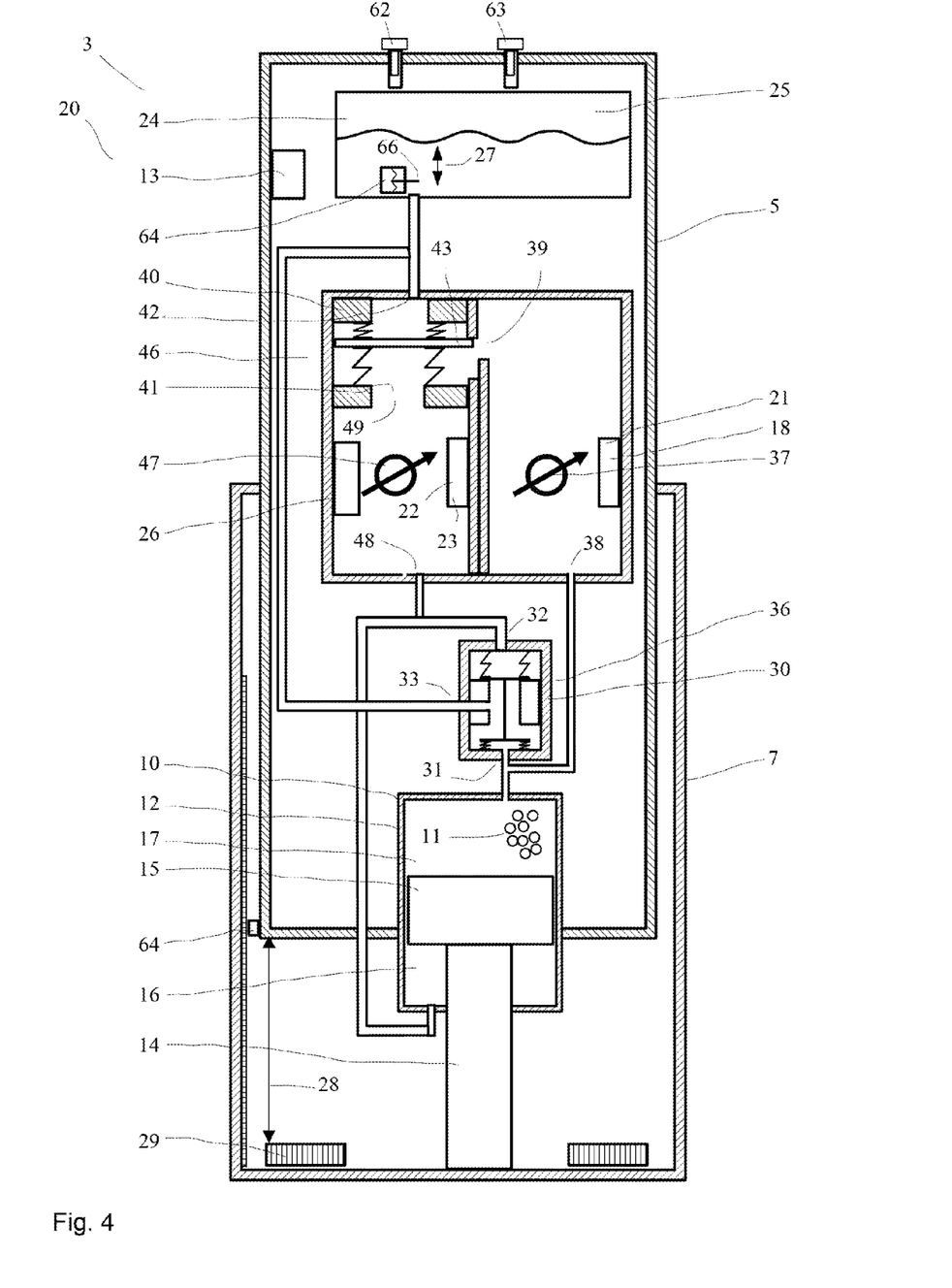
FIG. 4 is a similar sectional illustration of the tube system according to FIG. 2 in the rebound stage.

While FIG. 2 illustrates the basic state, FIG. 3 shows the state of the tube system 3 in the compression stage as the piston 15 continues to plunge into the damper chamber 12. Due to the entering piston 15 the pressure in the second chamber 17 increases such that the magneto-rheological fluid 11 is carried off upwardly out of the second chamber 17. The field-sensitive fluid 11 travels to the first switching valve 30 which is automatically switched to the first position 34 and thus separates the connection from the first port 31 to the other ports 32 and 33. At the same time a connection between the second port 32 and the third port 33 is opened at the first switching valve 30.

The damping fluid 11 carried off of the second chamber 17 travels through the first inlet 38 into the first throttle valve 37 where it is damped in a damping duct (see FIG. 5) according to the field strength of the field generating device 18. The damping fluid 11 leaves the first throttle valve 37 through the second inlet 39 and travels through the third port 43 of the second switching valve into the second switching valve 40.

By way of the entering damping fluid 11 the second switching valve 40 is transferred from the current position or a normal position 45 to the first position 44 illustrated in FIG. 3, unless the second switching valve 40 is already in the first position 44. In the first position 44 the first port 41 of the second switching valve 40 is closed. Then there is only a flow connection left between the second port 42 and the third port 43 at the second damping valve 40.

The damping fluid 11 leaves the second switching valve 40 via the second port 42 and part of it returns and travels via the third port 33 of the first switching valve 30 into the first switching valve 30 where a flow connection with the second port 32 is available. The damping fluid 11 flows from the second port 32 via the connecting line into the first damper chamber 16.

The piston rod portion entering into the damper chamber 12 displaces a corresponding volume of the field-sensitive damping fluid 11 which is carried off from the second port 42 of the second switching valve 40 into the equalizing chamber 24. The sensor 64, if any is provided, detects the inflow of the damping fluid and emits a corresponding signal to the control device 13 such that it detects the compression stage 19 and thus the compressing of the suspension fork.

The rebounding of the suspension fork will now be discussed with reference to FIG. 4 which shows the case of the rebound stage 20.

As a compressing action is finished, the suspension device 50 in the other tube system 4 urges the piston 15 back out of the damper chamber 12 in a defined damping action. The outer tube 7 glides on the inner tube 5.

As the piston 15 emerges from the damper chamber 12 of the damper device 10, part of the damping fluid 11 present in the first chamber 16 is pressed out of the first chamber 16. The damping fluid travels through the connected connecting line for one, to the first inlet 48 of the second throttle valve 47 and to the second port 32 of the first switching valve 30. The damping fluid 11 which is under superpressure causes the second port 32 of the first switching valve to close such that now there is only a flow connection left between the first port 31 and the third port 33 at the first switching valve 30. This is why the damping fluid 11 displaced from the first chamber 16 must enter through the first inlet 48 into the second throttle valve 47. Therein the damping fluid is exposed to the combined fields of the field generating device 23 and the remanence magnet 26 in a damping duct 65. This causes an appropriate damping in the second throttle valve 47.

The throttled fluid leaves the second throttle valve 47 through the second inlet 49 which is connected with the first port 41 of the second switching valve 40 via a connecting line or directly. By means of the flowing fluid the second port 42 of the second switching valve 40 is closed such that now there is only a flow connection left between the first port 41 and the third port 40 at the first switching valve 30.

The damping fluid 11 leaves the second switching valve 40 via the third port 43 and is guided directly or via a connecting line into the second inlet 39 of the first throttle valve 37. Damping takes place there corresponding to the magnetic field generated with the electric coil 21 of the field generating device 80. The damping fluid leaves the first throttle valve 37 via the first inlet 38 and travels directly into the second chamber 17 of the damping chamber 12.

For equalizing the piston rod volume and differences in temperature if any, an appropriate portion of the damping fluid travels out of the equalizing chamber 24 via the connecting line to the third port 33 of the first switching valve 30. A continuous connection with the first port 31 is present there such that the damping fluid coming out of the equalizing chamber 24 also passes directly into the second chamber 17.

Figure 5:
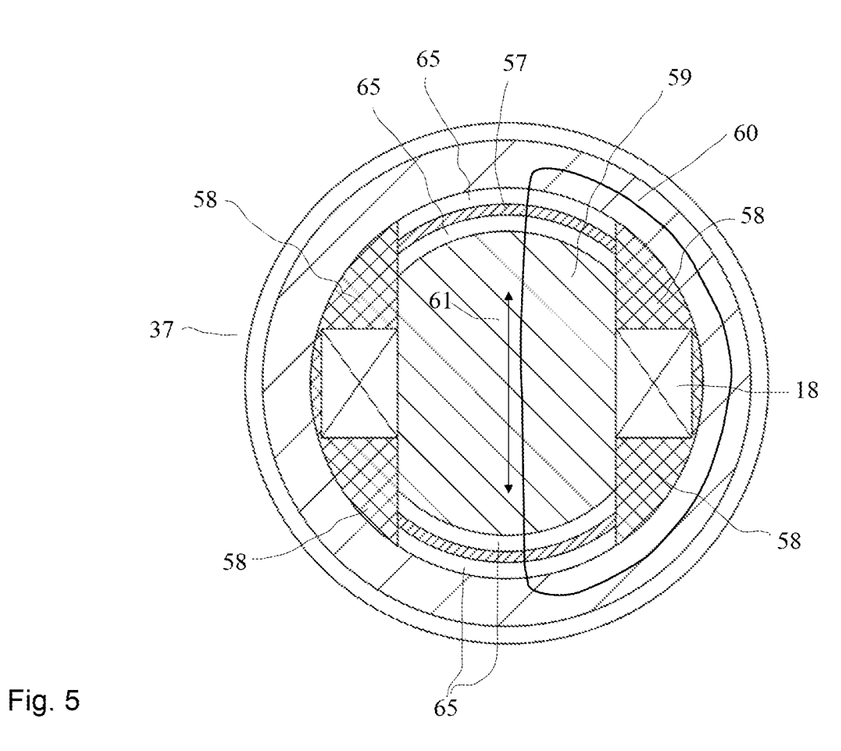
FIG. 5 shows a schematic cross-section of a throttle valve of the suspension fork according to FIG. 1.

FIG. 5 shows a schematic cross section of an exemplarily illustrated throttle valve 37. The inside of the presently illustrated first throttle valve 37 is provided with a central core 59 that is surrounded by a wound electric coil as the field generating device 18. Presently a total of four damping ducts 65 is provided which are separated in pairs from one another by a fan or a fan-like structure 57. This increases efficiency.

When a magnetic field is applied, the field lines 61 run through the core 59, pass approximately perpendicularly through a damping duct 65, the subsequent fan 57 and the second damping duct 65, and they are guided through the ring 60 of a magnetically conductive material, presently approximately in a semicircle around the core, until in the lower portion two damping ducts 65 are provided once again with a fan wall 57 in-between through which the field lines pass approximately perpendicularly such that continuous field lines 61 are present on the whole.

Magnetic insulating materials 58 are provided adjacent to an electric coil 21 as the field generating device 18 to shape the magnetic field as desired.

A specific case ensues, however, in that the application of a constant magnetic field to the second throttle valve 47 allows to achieve a lowering of the suspension fork 1. This is desired for example in steep uphill rides to achieve a more comfortable riding position and safe operation. The higher damping in the rebound stage 20 causes slower rebound of the suspension fork. This allows—in dependence on the field applied to the second throttle valve 47—to attain a dosed lowering of the suspension fork 1. The higher the magnetic field strength applied to the second throttle valve 47, the more lowering will take place.

At the same time the stronger rebound stage damping will not affect the damping of shocks since the second throttle valve 47 only acts in the case of the rebound stage. Weaker or stronger shocks can be damped in the same way as is the case when the suspension fork 1 is not lowered.

In the prior art, however, lowering tends to be associated with a kind of lock-out where damping does not take place at all or only to a minimal extent.

This is why on the whole the suspension fork 1 provides an advantageous configuration which is associated with an enhanced function combined with a simpler construction in a simple way.

The invention provides a favorably structured suspension fork 1 which can respond with flexibility to any requirements occurring. While in the case of the compression stage the first throttle valve 37 responds in real time to occurring shocks, in the case of the rebound stage the first throttle valve 37 and the second throttle valve 47 are automatically connected in series, thus allowing a wider operating range of the suspension fork 1.

The first switching valve 37 allows to always switch the equalizing chamber 24 and the equalizing volume 25 to the low-pressure area, i.e. behind the throttle valves 37 and 47 when seen in the flow direction. Even high damping forces allow to attain the most rigid total system possible which does not operate into the equalizing volume 25.

Moreover, an emergency running property can be provided.

The following is a list of reference numerals used in the above description and may aid the reader in the perusal of the specification:

1 suspension fork
2 head tube
3 tube system
4 tube system
5 inner tube
6 inner tube
7 outer tube
8 outer tube
9 wheel receiving space
10 damper device
11 magneto-rheological damping fluid
12 damper chamber
13 control device
14 piston rod
15 piston, pump piston
16 first chamber
17 second chamber
18 field generating device
19 compression stage
20 rebound stage
21 electric coil
22 electric coil
23 field generating device
24 equalizing chamber
25 equalizing volume
26 remanence magnet
27 direction
28 compression travel
29 end position damping
30 first switching valve
31 first port
32 second port
33 third port
34 first position
35 central position
36 second position
37 first throttle valve
38 first inlet
39 second inlet
40 second switching valve
41 first port
42 second port
43 third port
44 first position
45 central position
46 second position
47 second throttle valve
48 first inlet
49 second inlet
50 spring device
51 fork crown
52 connecting bracket
53 dropout
54 dropout
57 fan
58 insulating material
59 core
60 ring
61 field line
62 valve
63 valve
64 sensor device
65 damping duct
66 detector.

The invention claimed is:

1. A suspension fork, comprising:
a head tube, at least one tube system connected to said head tube and including an inner tube and an outer tube movably disposed relative to one another, and a wheel receiving space adjacent said tube system;
a damper device disposed within said tube system, said damper device having a damper chamber, a field-sensitive damping fluid, and a piston connected to a piston rod and movable in a compression stage and a rebound stage, said piston partitioning said damper chamber to form a first chamber and a second chamber;
a first throttle valve with a first field generating device and a second throttle valve with a second field generating device configured for selectively influencing said first and second throttle valves; and
a first switching valve and a second switching valve configured and interconnected with said first and second throttle valves to cause a flow of damping medium only through said first throttle valve in the compression stage while, in the rebound stage, said first and second throttle valves are connected in series.

2. The suspension fork according to claim 1, wherein at least one of said first switching valve or said second switching valve comprises at least three ports each, and at least two of said ports are connected in each position.

3. The suspension fork according to claim 2, wherein at least one of said first switching valve or said second switching valve is biased in a central position in which said three ports are interconnected.

4. The suspension fork according to claim 1, wherein said second chamber is connected with a first port of said first switching valve and with a first inlet of said first throttle valve.

5. The suspension fork according to claim 1, wherein a second inlet of said first throttle valve is connected with a third port of said second switching valve.

6. The suspension fork according to claim 1, wherein said first chamber is connected with a second port of said first switching valve and with a first inlet of said second throttle valve.

7. The suspension fork according to claim 1, wherein a second inlet of said second throttle valve is connected with a first port of said second switching valve.

8. The suspension fork according to claim 1, wherein a second port of said second throttle valve is connected with a third port of said first switching valve.

9. The suspension fork according to claim 1, wherein said first switching valve has a first position wherein said second port is connected with said third port and a second position wherein said second port is connected with said first port.

10. The suspension fork according to claim 1, wherein said second switching valve has a first position wherein said second port is connected with said third port and a second position wherein said first port is connected with said third port.

11. The suspension fork according to claim 1, wherein said piston rod extends through and out of said first chamber and outwardly out of said damper chamber.

12. The suspension fork according to claim 1, which further comprises an equalizing chamber containing an upstream equalizing volume.

13. The suspension fork according to claim 1, wherein said first throttle valve comprises an electric coil forming said first field generating device.

14. The suspension fork according to claim 1, wherein said second throttle valve comprises a remanence magnet and an electric coil, and wherein said electric coil is configured to permanently adjust a strength of a magnetic field of said remanence magnet with a magnetic pulse of said electric coil.

15. The suspension fork according to claim 1, which further comprises a control device and at least one sensor device.

16. The suspension fork according to claim 15, wherein said sensor device is configured for capturing a rate of a speed of said piston relative to said damper chamber.

17. The suspension fork according to claim 15, wherein said sensor device is configured for capturing a direction of a relative movement between said piston and said damper chamber.

18. The suspension fork according to claim 15, wherein said sensor device is configured for capturing a measure for a compression travel.

19. The suspension fork according to claim 1, which further comprises at least one end position damping device in said tube system.

20. The suspension fork according to claim 1, wherein, in an orientation of intended use, said first and second throttle valves are disposed above said damper chamber.

21. The suspension fork according to claim 20, which comprises an equalizing chamber disposed above at least one of said throttle valves.

22. The suspension fork according to claim 1, wherein said second throttle valve is configured to serve as a lowering valve and/or to provide emergency running properties.

* * * * *